United States Patent Office 3,361,664
Patented Jan. 2, 1968

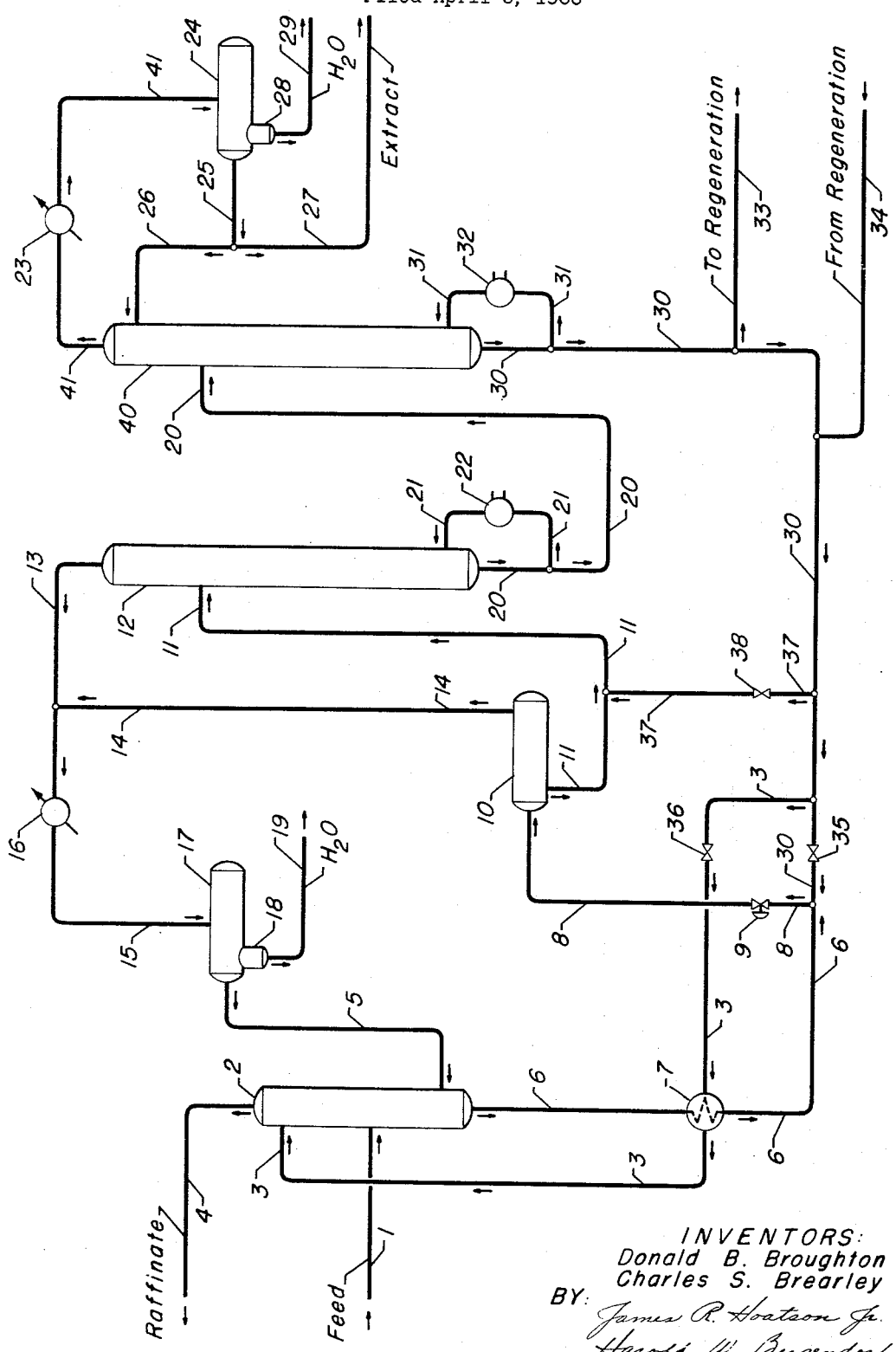

3,361,664
FLASHING AND EXTRACTIVELY DISTILLING
AN EXTRACT
Donald B. Broughton, Evanston, and Charles S. Brearley, Lake Forest, Ill., assignors to Universal Oil Products Company, Des Plaines, Ill., a corporation of Delaware
Filed Apr. 5, 1966, Ser. No. 540,362
10 Claims. (Cl. 208—313)

ABSTRACT OF THE DISCLOSURE

A sulfolane type liquid-liquid extraction process for the recovery of aromatics from a hydrocarbon feed stock wherein the aromatics-rich extract phase, which contains a minor amount of non-aromatic impurities, e.g., paraffins and naphthenes, is subjected to a preliminary flash separation prior to extractive distillation of the remaining unflashed extract phase. The extractive distillation zone is operated to drive substantially all of the remaining non-aromatics overhead. The extractive distillation zone overhead is combined with the flashed vapor portion of the extract phase and recycled to the extraction zone as a backwash stream. The bottoms from the extractive distillation zone is passed to a solvent recovery fractionator which provides a high purity aromatics overhead fraction and a lean sulfolane bottoms fraction which is returned to the extraction zone.

---

This invention relates to an improved solvent extraction process wherein a feed is separated into a more polar fraction and a less polar fraction. More specifically, this invention relates to a process for partially separating said feed in the liquid phase in a solvent extraction zone and partially separating the feed in an extractive distillation zone. Still more specifically, this invention relates to the flashing of a portion of the extract phase from the extraction zone prior to extractive distillation of the extract phase to improve the purity of the extract and/or reduce the operating cost of the process.

In one of its embodiments, this invention relates to an improvement in a solvent extraction process for the separation of a feed stock into a more polar component and a less polar component wherein the feed is contacted with a lean solvent in an extraction zone thereby forming a rich solvent extract phase containing more polar component and a minor amount of less polar component and a less polar component raffinate phase, the extract phase is introduced into an extractive distillation zone thereby forming an overhead fraction containing less polar component and a bottoms fraction containing solvent and more polar component, the overhead fraction is recycled to the extraction zone and the more polar component is recovered from the solvent, the improvement which comprises flashing a portion of the extract phase and combining the flashed vapor portion with the overhead fraction before recycling to the extraction zone.

This invention is applicable to solvent extraction processes wherein the entire separation is attained in two stages, namely, in an extraction zone and an extractive distillation zone. In these processes, generally the feed is contacted with a lean solvent in the extraction zone thereby producing a raffinate phase and an extract phase. Preferably, the extraction zone is operated to produce an essentially more polar component free raffinate and an extract phase comprising solvent, substantially all of the more polar component and a small amount of less polar component. The extractive distillation zone is operated to remove the remaining less polar component from the extract phase thereby producing high purity more polar component. Generally, said removed less polar component is recycled to the extraction zone. Usually the extraction zone is operated in the liquid phase and at a higher pressure than the extractive distillation zone. When the pressure on the extract phase is reduced to the pressure in the extractive distillation zone, there is a certain amount of flashing. It has been found that by controlling the amount of flashing that occurs within a particular range and not introducing the resulting flashed vapors into the extractive distillation zone, an improved process results.

The present improvement invention is preferably incorporated into a solvent extraction process for the separation of classes of hydrocarbons from a hydrocarbon feed stock. More specifically, the solvent extraction process is employed to separate aromatic hydrocarbons from a hydrocarbon feed in which a lean solvent selective for said aromatic hydrocarbons and immiscible with the feed is countercurrently contacted with said feed in an extraction zone thereby dissolving substantially all of the aromatics plus a small amount of non-aromatic hydrocarbons such as naphthenes and paraffins into the now rich solvent phase. The hydrocarbon phase, called the raffinate and containing essentially no aromatic hydrocarbons is withdrawn from the extraction zone. This rich solvent phase, also called the extract phase, is withdrawn from the extraction zone and subjected to controlled flashing and the flashed vapors are condensed and returned to the extraction zone. The flashed liquid is introduced into an extractive distillation zone where the remaining non-aromatic hydrocarbons plus some aromatic hydrocarbons are distilled therefrom and recycled to the extraction zone. The remaining liquid consisting essentially of aromatics and solvent is separated in a recovery zone thereby producing a lean solvent which is recycled to the extraction zone and the extractive distillation zone and a high purity aromatics product.

It is thought that the controlled flashing step of this invention aids in the production of high purity aromatics by reducing the hydrocarbon content of the solvent on the decks of the extractive distillation zone thereby leading to higher volatilities of non-aromatics relative to aromatics in the extractive distillation zone. This will result in higher aromatic purities if all other variables are held constant or alternately will reduce the number of decks and capital cost or reduce operating costs if the incremental improvement in purity of aromatics is not desired.

It is an object of the present invention to improve the purity of aromatic hydrocarbons extracted from a hydrocarbon feed stock in a solvent extraction process.

It is another object of the present invention to reduce the cost of building and/or operating a solvent extraction process.

It is a more specific object of the present invention to selectively reduce the hydrocarbon concentration of the extract phase from an extraction zone in a solvent extraction process and thereby reduce the required severity of the extractive distillation step to remove the non-aromatic hydrocarbons from the extract phase.

These and other objects will become more apparent especially in the light of the following detailed description.

The accompanying drawing shows a flow scheme for carrying out the process of this invention. The hydrocarbon feed is introduced into extraction zone 2 through conduit 1, preferably about ⅓ of the way along its height from the bottom. This permits the feed to contact the solvent in the upper ⅔ of the extraction zone and permits the extract phase to contact the light reflux backwash stream flowing in conduit 5 in the bottom ⅓ of the extractor. The lean solvent is introduced near the top of extraction zone 2 and since it is denser and immiscible with the feed, it will countercurrently contact said feed in zone 2. The extraction zone is maintained at an elevated temperature and a pressure sufficiently high to maintain the solvent and the feed compounds in the liquid phase. Since the solvent has a solubility selectivity for aromatics over non-aromatics and the solvent is immiscible with the feed, aromatics will preferentially dissolve into the solvent phase. Thus, as the solvent phase passes downflow through the upper ⅔ of extraction zone 2, the aromatics concentration therein gradually increases. The feed hydrocarbon phase passes upflow through zone 2 since it is less dense than the solvent phase and the extraction zone contains suitable means to efficiently contact the feed phase and the solvent phase such as rotary discs, contacting decks, packing, etc. As the feed hydrocarbon phase passes upflow through the extractor, the aromatics and a small quantity of non-aromatics gradually dissolve into the solvent phase such that when the hydrocarbon phase reaches the top of zone 2, it contains essentially no aromatics and is called the raffinate. The raffinate is withdrawn from extraction zone 2 through conduit 4 where it may be water washed to remove small quantities of dissolved solvent therefrom. The rich solvent passes into the lower ⅓ of extraction zone 2 where it countercurrently contacts an immiscible light hydrocarbon stream in a procedure called the backwash. Generally, said light hydrocarbon stream has a lower average boiling point than does the feed and therefore the backwash results in the displacement from the rich solvent phase and into the backwash hydrocarbon phase of the heavier non-aromatic hydrocarbons and accompanying replacement thereof of lighter non-aromatic hydrocarbons into the rich solvent phase. The backwash step helps in producing high purity aromatics since it is easier to remove lighter non-aromatics than heavier non-aromatics in the extractive distillation zone.

The backwashed extract phase containing solvent, aromatic hydrocarbons and a small amount of light non-aromatic hydrocarbons is withdrawn from extraction zone 2 through conduit 6 where it is heat exchanged with the hot lean solvent in heat exchanger 7. The heated extract phase is withdrawn therefrom through conduit 6 where it directly mixes with additional hot lean solvent flowing in conduit 30. The resulting mixture flows through conduit 8 and pressure reducing control valve 9 where said mixture flashes. The flashed mixture flows into flash zone 10 wherein the mixture is separated into a vapor phase and a liquid phase. The liquid phase is withdrawn through flow conduit 11 where it flows to extractive distillation zone 12. The flashed vapor phase comprising light non-aromatics and aromatics is withdrawn through conduit 14.

Extractive distillation zone 12 is able to remove the remaining non-aromatic components of the extract phase because the presence of the solvent in the stripper has less effect on the boiling point of the non-aromatic compounds dissolved in the solvent than it does on the aromatic compounds also dissolved in the solvent. This effect is further taken advantage of by injecting additional lean solvent into the extract phase through conduit 30 and/or conduit 37. In general, the solvent tends to retain in solution the more soluble aromatic component even at temperatures considerably above the boiling point of the aromatics alone. The extractive distillation zone 12 is operated at elevated temperatures and intermediate pressures in order to remove substantially all the non-aromatics, some of the water and aromatics and a small amount of solvent overhead as a vapor stream. The vapor stream is withdrawn from extractive distillation zone 12 through conduit 13 where it combines with said vapor phase in conduit 14 and the resulting mixture pass through condenser 16 and conduit 15 ending up in receiver 17. This condensed resulting mixture separates into two phases in receiver 17, one a water-solvent phase and the other a light hydrocarbon phase. The light hydrocarbon phase is withdrawn from receiver 17 through conduit 5 where it is recycled back to the lower part of extraction zone 2 to backwash the rich solvent therein. The water-solvent phase settles in boot 18 where it is withdrawn therefrom through conduit 19 and is sent to solvent recovery means not shown. A bottoms fraction comprising aromatics and solvent is withdrawn from extractive distillation zone 12 through conduit 20 where a portion thereof flows through conduit 21 and reboiler heater 22 and returns to zone 12. The remaining bottoms portion flows through conduit 20 and into solvent recovery zone 40.

Zone 40 is operated at low pressures, either slightly superatmospheric or under vacuum and elevated temperatures to separate the solvent from the aromatics. The aromatics and a small amount of water are removed as a vapor overhead from zone 40 through conduit 41 and pass through condenser 23 and into receiver 24. This condensed overhead is separated into an aromatic hydrocarbon phase and a water phase. The aromatics are withdrawn from receiver 24 through conduit 25 where a portion thereof returns to zone 40 as reflux while the remaining portion of aromatics is withdrawn through conduit 27 as the net aromatics extract product. The water phase which settles in boot 28 is withdrawn through conduit 29. Generally, the net extract product is sent to a series of fractionators to recover the individual aromatics as substantially pure compounds such as benzene, toluene, ortho-xylene, ethylbenzene, etc.

A bottoms fraction comprising lean solvent is withdrawn from solvent recovery zone 40 through conduit 30 where a portion thereof flows through conduit 31 and reboiler heater 32 and returns to zone 40. The remaining lean solvent flows through conduit 30 where it is recycled to the extractive distillation zone and/or the extraction zone. A small but discernible amount of decomposition of solvent and other sludge forming reactions may occur in the process and it is desirable to remove a small slipstream of lean solvent from conduit 30 through conduit 33 and regenerate this solvent slipstream in equipment not shown in order to prevent the buildup of sludge. The regeneration preferably is done by rerunning the solvent and thereafter returning the regenerated solvent to conduit 30 by means of conduit 34. The lean solvent flows through conduit 30 where a portion thereof may pass through conduit 37 and valve 38 mixing with the flashed liquid extract phase or may pass through valve 35 and mix with the unflashed extract phase. The remaining portion of lean solvent passes through conduit 3, valve 36, heat exchanger 7 (a portion of this lean solvent may bypass the heat exchanger to control the lean solvent inlet temperature) and is recycled to the upper portion of extraction zone 2. If desired a part of the portion of the lean solvent can be mixed with the unflashed extract phase and another part with the flashed extract phase by suitable adjustment of valves 35 and 38.

The heart of the present invention relates to the flashing of the extract phase and the removal of the flashed vapors prior to the extractive distillation step. It is desirable that the amount of flashed vapor be from about 5% to about 50% by volume of the total backwash stream flowing in conduit 5. Preferably, the amount of flashed vapors are from about 10 up to about 40% by volume with 25 to about 35% by volume being especially preferable. The amount of flashing obtained is primarily controlled by two variables, namely, the temperature of the extract phase in conduit 8 and the pressure downstream of valve 9 in flash zone 10. As the temperature of the extract phase increases, the amount of flashing increases. Likewise, as the pressure in flash zone 10 decreases, the amount of flashing increases. Therefore, by controlling these two variables, the amount of flashing can be controlled within the above preferable ranges. The above mentioned flashing range is significant. If too little flashing is attained, the extractive stripper will have a more difficult separation to make due to the high hydrocarbon content of the solvent phase which leads to lower volatilities of non-aromatics relative to aromatics. If too much flashing is attained the benefits of extractive distillation will be lost. This is readily seen if one imagines the case of 100% flashing. In this event the entire separation will be done in one separation stage rather than the multiple theoretical separation stages present in the extractive stripper. This, of course, results in low efficiency of separation and requires a large absolute flashed vapor stream in order to remove substantially all of the non-aromatics from the rich solvent phase. It is felt that the practical maximum limit of flashing is about 50 volume percent of the total backwash stream. Although flash zone 10 is shown as a separate vessel in the drawing, it may also be mounted on top of extractive distillation zone 12 and the flashed liquid can be introduced into the top of zone 12 by a gravity flow system.

Suitable feed stocks comprise fluid hydrocarbon mixtures having a sufficiently high concentration of aromatic hydrocarbons to economically justify the recovery of aromatics. Preferably, the aromatics are present in the feed in concentrations of at least 25% by weight. The suitable carbon number range of feed stocks is from about 6 carbon atoms per molecule ($C_6$) to about 20 ($C_{20}$) and preferably from $C_6$ to $C_{10}$. One source of a preferable feed stock is the debutanized or depentanized reactor effluent from a reforming processing unit. Another preferable source is the liquid by-product from a pyrolysis processing unit which has been hydrotreated to saturate diolefins and olefins and to remove contaminants.

Suitable solvents that may be employed in the process of this invention comprise sulfolane type compounds, glycol type compounds, dimethylsulfoxide and N-methyl pyrrolidon. Preferable solvents comprise sulfolane, sulfolene, dimethylsulfolane, polyethylene glycol and polypropylene glycol with sulfolane being especially preferable. Sulfolane has the following structural formula:

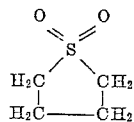

The aromatic selectivity of the preferable solvents can be further enhanced by the addition of water to the organic solvent. Preferably, the present solvents contain a small amount of water dissolved therein to increase the selectivity of the solvent phase for aromatic hydrocarbons over non-aromatic hydrocarbons without reducing substantially the solubility of the solvent phase for aromatic hydrocarbons. The presence of water in the solvent composition furthermore provides a relatively volatile material therein which is distilled from the rich solvent in the extractive distillation zone to strip the last traces of non-aromatic hydrocarbon from the rich solvent by steam distillation. The solvent composition contains from about 0.5 to about 20% by weight of water and preferably from about 2 to about 15% depending on the particular organic solvent and the process conditions under which the extraction, extractive distillation and solvent recovery zones are operated.

The extraction zone is operated at elevated temperature and at a sufficiently elevated pressure to maintain the feed stock, solvent and light backwash streams in the liquid phase. Suitable temperatures are within the range of from 80° F. to about 400° F. and preferably from about 150° F. to about 300° F. Suitable pressures are within the range of from about slightly superatmospheric pressure up to about 400 p.s.i.g., and preferably from about 50 p.s.i.g. to about 150 p.s.i.g It is preferable that the volume of backwash material introduced into the lower part of the extraction zone be at least 10% by volume of the extract phase leaving the extractor in order to effectively displace the heavier non-aromatic hydrocarbons from the extract phase.

The extractive distillation zone is operated at moderate pressures and sufficiently high reboiler temperatures to drive all the light backwash non-aromatic components and some of the aromatics, water and solvent overhead. Typical extractive distillation zone pressures are from atmospheric pressure up to about 100 p.s.i.g., although generally the top of said zone is maintained at from about 1 p.s.i.g. up to about 20 p.s.i.g The pressure at the top of said zone will also be the pressure in flash zone 10 which as described hereinbefore is one of the variables determining the extent of flashing The reboiler temperature is dependent upon the composition of the feed stock and the solvent, although in the case of a $C_6$–$C_{10}$ feed stock with sulfolane as the solvent, temperatures of from about 275 up to about 360° F. are satisfactory.

The solvent recovery zone is operated at low pressures and sufficiently high temperatures to drive the aromatic hydrocarbons overhead, thus producing a lean solvent bottoms. The choice of operating conditions depends on the feed stock and solvent compositions. When using a $C_6$–$C_{10}$ feed stock with sulfolane as the solvent, preferably the top of the solvent recovery zone is maintained at vacuum pressures of from about 100 to about 400 mm. mercury absolute. These low pressures must be used in this case since the reboiler temperature should be maintained below about 370° F. to avoid thermal decomposition of the sulfolane.

The apparatus employed in the process of this invention may be any conventional convenient type known to those skilled in the art. For simplicity and brevity, the drawing does not show all the pumps, tanks, heat exchangers, valves, bypasses, vents, coolers, heaters, control valves, means for actuating control valves and other auxiliary equipment that may be necessary for the proper operation of the process but the inclusion of which will be evident to those skilled in the art.

The following example is presented to further illustrate the process of this invention but it is not intended to limit the broad scope of the disclosed invention thereby.

Example I

A debutanized reformate is fractionated to produce a predominantly $C_6$–$C_7$ feed. This feed is analyzed and contains about 30.6 volume percent aromatics, 8.7 volume percent naphthenes and 60.7 volume percent paraffins. This feed is introduced into extraction zone 2 through conduit 1 at a rate of 1460 moles/hr. The point of introduction of feed into zone 2 is such that there is about 6 theoretical decks above the feed point and 1 theoretical deck below the feed point. Lean solvent is introduced into the upper part of zone 2 through conduit 3 at a rate of 4650 moles/hr. Zone 2 is maintained at a temperature of about 180° F. Extract phase is withdrawn through conduit 6 where it passes through heat exchanger 7, valve 9, flash zone 10 and into extractive distillation zone 12. No additional lean solvent is added to the extract phase before said phase is introduced into zone 12. The accompanying Table A shows the results of varying the extent of flashing on the purity of the aromatics produced in conduit 27 by several techniques. All the results shown in Table A are based on essentially constant aromatic recovery from the feed. In all cases, 99.7% of the benzene, 98.7% of the toluene and 94.7% of the $C_8$ aromatics present in the feed are recovered in conduit 27.

Columns 1, 2 and 3 of Table A shows the effect of flash zone pressure on the extent of flashing and resulting aromatics purity. Columns 4 and 5 of the Table A show the effect of extract phase temperature on the extent of flashing and resulting aromatics purity.

TABLE A

| Column | 1 | 2 | 3 | 4 | 5 |
|---|---|---|---|---|---|
| Backwash/Extract (mol/mol) | 1.00 | 1.00 | 1.00 | 1.50 | 1.50 |
| Flash zone pressure, p.s.i.a. | 34.7 | 29.7 | 24.7 | 24.7 | 24.7 |
| Extract temperature before flash, °F | 225 | 225 | 225 | 240 | 225 |
| Extract temperature after flash, °F | 222 | 218 | 214 | 225 | 213 |
| Moles/hr., flash vapor | 50 | 130 | 209 | 300 | 238 |
| Moles/hr., total backwash | 550 | 550 | 550 | 825 | 825 |
| Mol percent of backwash derived from flash | 9.1 | 23.6 | 38.0 | 36.4 | 28.8 |
| Extractive distillation reboiler temp., °F | 379 | 362 | 344 | 344 | 344 |
| Reboiler heat duty MM B.t.u./hr. | 41.5 | 37.7 | 33.5 | 33.5 | 37.2 |
| Total Non-aromatics in extract, mol/hr. | 0.060 | 0.052 | 0.047 | 0.016 | 0.019 |

Comparing the results of Columns 1, 2, and 3 clearly shows that lowering the absolute pressure on the flash zone increases the amount of flashing, increases the purity of the aromatics extract and decreases the heat load of the extractive distillation reboiler. Likewise, the results of Columns 4 and 5 clearly shows that higher extract temperature prior to flashing increases the amount of flashing, increases the purity of the aromatics extract and decreases the heat load of the extractive distillation reboiler. Specifically increasing the flashing so that the mole percent of backwash derived from flashed vapors is increased from 9.1% up to 38% reduces the amount of non-aromatics present in the extract phase by 21.7% and decreases the reboiler heat duty by 19.4%. It becomes readily apparent that controlled flashing of the extract phase is useful in increasing aromatics purity and reducing costs in these solvent extraction processes.

We claim as our invention:

1. A solvent extraction process for the separation of a hydrocarbon feed stock into a more polar component and a less polar component, utilizing a liquid solvent which is substantially immiscible with said feed and selective for said more polar component and separable therefrom by fractional distillation, which comprises contacting the feed with lean solvent in an extraction zone thereby forming a rich solvent extract phase containing more polar component and a minor amount of less polar component and a less polar component raffinate phase, withdrawing said extract phase from the extraction zone and flashing a portion of the extract phase to form a flashed vapor portion comprising said less polar component, passing the resulting unflashed portion of the extract phase to an extractive distillation zone maintained under conditions to drive substantially all of the remaining less polar component overhead, thereby forming an overhead fraction containing less polar component and a bottoms fraction containing solvent and more polar component, combining said flashed vapor portion with said overhead fraction and recycling the resulting mixture to said extraction zone, passing said bottoms fraction to a solvent recovery distillation zone and recovering therefrom a first fraction comprising more polar component and a second fraction comprising lean solvent.

2. The process of claim 1 further characterized in that said more polar component comprises aromatic hydrocarbons and said less polar component comprises at least one hydrocarbon selected from the group consisting of parraffins and naphthenes.

3. The process of claim 2 further characterized in that the carbon number range of the feed comprises from about 6 up to about 10 carbon atoms per molecule.

4. The process of claim 3 further characterized in that the solvent comprises at least one organic compound selected from the group consisting of sulfolane type compounds, glycol type compounds, dimethylsulfoxide and N-methyl pyrrolidon.

5. The process of claim 4 further characterized in that the sulfolane type compounds comprise sulfolane, sulfolene,, and dimethyl sulfolane and the glycol type compounds comprise polyethylene glycol and polypropylene glycol.

6. The process of claim 5 further characterized in that the organic solvent comprises sulfolane and contains up to about 20% by weight of water.

7. The process of claim 6 further characterized in that the extract phase is mixed with additional lean solvent and the amount of flashed hydrocarbons is from about 5% to about 50% by volume of the total stream recycled to the extraction zone.

8. The process of claim 7 further characterized in that said amount of flashed hydrocarbons is from about 25 up to about 35% by volume.

9. The process of claim 8 further characterized in that the additional lean solvent is added to the extract phase prior to flashing.

10. The process of claim 8 further characterized in that the additional lean solvent is added to the unflashed portion of the extract phase after the extract phase had been flashed.

References Cited

UNITED STATES PATENTS

| 2,809,222 | 10/1957 | Hawkins et al. | 208—321 |
| 2,938,858 | 5/1960 | Brown | 208—321 |
| 3,065,169 | 11/1962 | Zuiderweg et al. | 208—321 |
| 3,209,047 | 9/1965 | Young | 208—321 |

HERBERT LEVINE, *Primary Examiner.*